United States Patent
Winship

(10) Patent No.: US 6,896,300 B2
(45) Date of Patent: May 24, 2005

(54) EXTERNAL REFACING INDICATOR FOR A TOOL JOINT

(75) Inventor: Thomas Edward Winship, College Station, TX (US)

(73) Assignee: Grant Prideco, LP, Houston, TX (US)

(*) Notice: Subject to any disclaimer, the term of this patent is extended or adjusted under 35 U.S.C. 154(b) by 43 days.

(21) Appl. No.: 10/292,072

(22) Filed: Nov. 12, 2002

(65) Prior Publication Data

US 2004/0090062 A1 May 13, 2004

(51) Int. Cl.[7] ............................................... F16L 35/00
(52) U.S. Cl. ...................... 285/333; 285/93; 285/332.1
(58) Field of Search ................................. 285/333, 390, 285/93, 334, 334.2, 332.1, 332.4

(56) References Cited

U.S. PATENT DOCUMENTS

| | | | | |
|---|---|---|---|---|
| 2,075,427 A | * | 3/1937 | Church ........................ 285/333 |
| 2,091,906 A | * | 8/1937 | Bettis ......................... 285/333 |
| 2,258,066 A | * | 10/1941 | Oyen ......................... 285/334 |
| 3,442,536 A | * | 5/1969 | Fowler ..................... 285/332.4 |
| 3,633,944 A | * | 1/1972 | Hamburg ..................... 285/93 |
| 3,822,902 A | * | 7/1974 | Maurer et al. ........... 285/332.2 |
| 4,317,585 A | * | 3/1982 | Boice ......................... 285/93 |
| 4,438,953 A | | 3/1984 | Timme, Jr. |
| 4,548,431 A | * | 10/1985 | Hall et al. .................. 285/334 |
| 5,169,183 A | * | 12/1992 | Hallez ........................ 285/334 |
| 5,221,113 A | * | 6/1993 | Stoll ........................... 285/333 |
| 5,573,281 A | * | 11/1996 | Keller ..................... 285/332.4 |
| 5,709,416 A | * | 1/1998 | Wood ......................... 285/333 |
| 6,009,611 A | * | 1/2000 | Adams et al. .............. 285/333 |

* cited by examiner

Primary Examiner—David E. Bochna
(74) Attorney, Agent, or Firm—Loren G. Helmreich; Browning Bushman, P.C.

(57) ABSTRACT

Makeup plates on the abutting surfaces of a tool joint pin and a tool joint box are provided. The makeup plates are recessed in a short distance from the outer diameter of the tool joint elements, such that when the joint is made up, the makeup plate develops an easily visible gap between the tool elements. In this way, a quick determination may be made, without measurement, as to whether the joint can be refaced, or require re-machining.

14 Claims, 3 Drawing Sheets

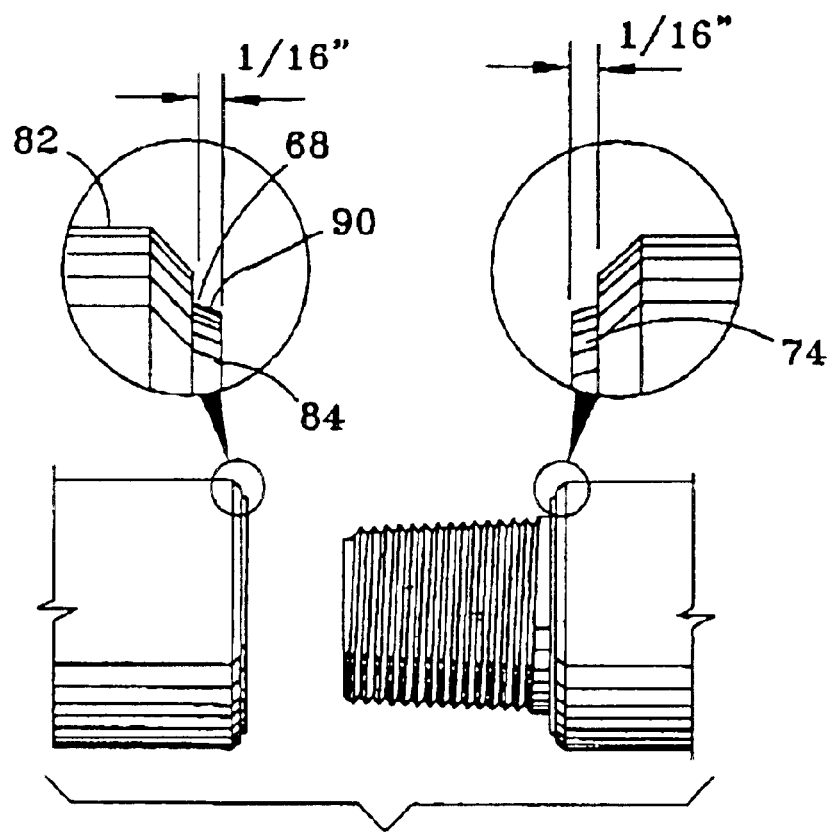
FIG.5a
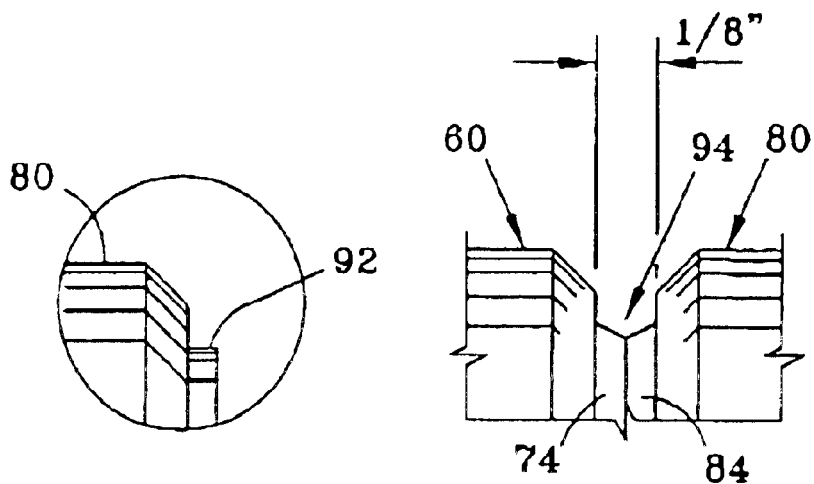
FIG.5b
FIG.6

EXTERNAL REFACING INDICATOR FOR A TOOL JOINT

BACKGROUND OF THE INVENTION

This present invention relates general to tool joints and more particularly to an externally visible indicator for facing the tool joints of drill pipe and other tubulars.

As described in U.S. Pat. No. 4,438,953 to Timme, Jr., a string of oil and gas well drill pipe is made up of sections of pipe, each about 30 feet long. Each section has an externally threaded pin on one end and an internally threaded box on the other end. When coupled together, the pin and the box form a tool joint. Each set of threads is tapered and has a point where the pitch diameter is a specific amount, this point being known as the gage point. A make-up shoulder is spaced a selected distance from the gage point of the threads on the pin. Another make-up shoulder is located at the outer end of the box. When fully made-up, these make-up shoulders contact each other under a selected amount of compression to provide a fluid-tight seal. To achieve the proper amount of compression, the distance from the pin make-up shoulder to the gage point of the pin threads, and the distance from the box make-up shoulder to the gage point of the box threads, must be carefully controlled.

During use, the make-up shoulders may gall and score. To achieve a smooth surface again, the shoulders are redressed. It is important that the total material removed from the two mating shoulders be no more than $1/16$ inch from original, or no more than $1/32$ inch from any shoulder. If the material removal totals more than $1/16$ inch from mating shoulders, inadequate compression may occur during make-up, thus requiring the mating faces to be remachined. Without such corrective measures, fatigue failures and washouts may result.

The American Petroleum Institute recommends to manufacturers the use of an indented circle and tangent bar or line stamped into the tool joint pin and the box counterbore. The bar would be impressed into the metal exactly $1/8$ inch from, and parallel to, the make-up shoulder. This method has two shortcomings. First, it must be hand-applied. Therefore, it is time consuming and potentially unreliable. Also, this method marks only one point of the pin or box.

In the '953 patent, Timme, Jr. taught a bench mark consisting of a bench mark shoulder formed around the pin outer diameter $1/8$ inch from the make-up shoulder. The box counterbore had a step formed around it $1/8$ inch from the make-up shoulder. The bench mark shoulder provided a reference line to determine the distance from the makeup shoulder to the reference line, after the make-up shoulder had been redressed. Because the bench mark was a continuous step around the circumference of the pin outer diameter, and a continuous counterbore around the circumference of the box inner diameter, it also served as an indicator of uneven machining of the tool joint shoulder. The mark was placed on the tool joint during the operation in which threads were machined onto the tool joint.

The benchmark shown and described in the '953 has proven to be successful, but suffers from a drawback in that, when the joint has been made up, the benchmark can neither be seen nor measured. In order to determine if the maximum amount of facing has been performed on the mating shoulder surfaces, the joint must be uncoupled, and a measurement made to make this determination. Also, certain prior art benchmarks require the removal of a thread protector, and a certain amount of cleaning of the connection itself prior to making a determination as to whether or not the faces must be machined.

Thus, there remains a need for a externally visible and measurable refacing indicator for a tool joint. Such an indicator should be easily manufactured, and not increase the cost of the pin or the box elements which make up the tool joint. The present invention is directed to this need in the art.

SUMMARY OF THE INVENTION

The present invention addresses this and other needs in the art by providing a makeup plate on the abutting surface of a tool joint pin and a tool joint box. The makeup plate is recessed in a short distance from the outer diameter of the tool joint element, such that when the joint is made up, the makeup plate develops an easily visible gap between the tool elements. In this way, a quick determination may be made, without measurement, as to whether the joint can be refaced, or require re-machining.

These and other features and advantages of the invention will be apparent to those skilled in the art from a review of the following detailed description, along with the accompanying drawing figures.

BRIEF DESCRIPTION OF THE DRAWINGS

FIG. 5a is a detail view of the facing indicator of the invention. FIG. 5b is a detail view of an alternative embodiment of the invention, showing an edge of the facing indicator as vertical, rather than beveled as in FIG. 5a.

FIG. 6 is a detail view of abutting surfaces of a made up tool joint employing the present invention.

DESCRIPTION OF THE PREFERRED EMBODIMENT

Figure 1:
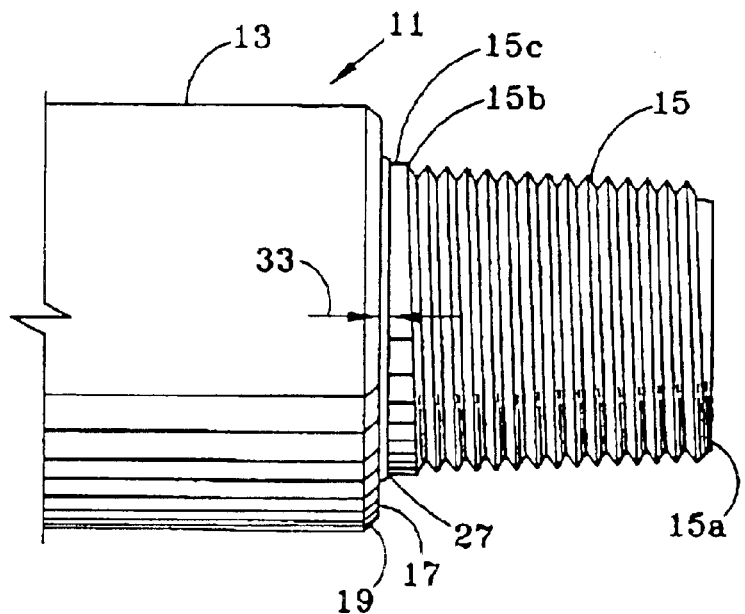
FIG. 1 is a side view of a tool joint pin having a prior art bench mark.
Figure 2:
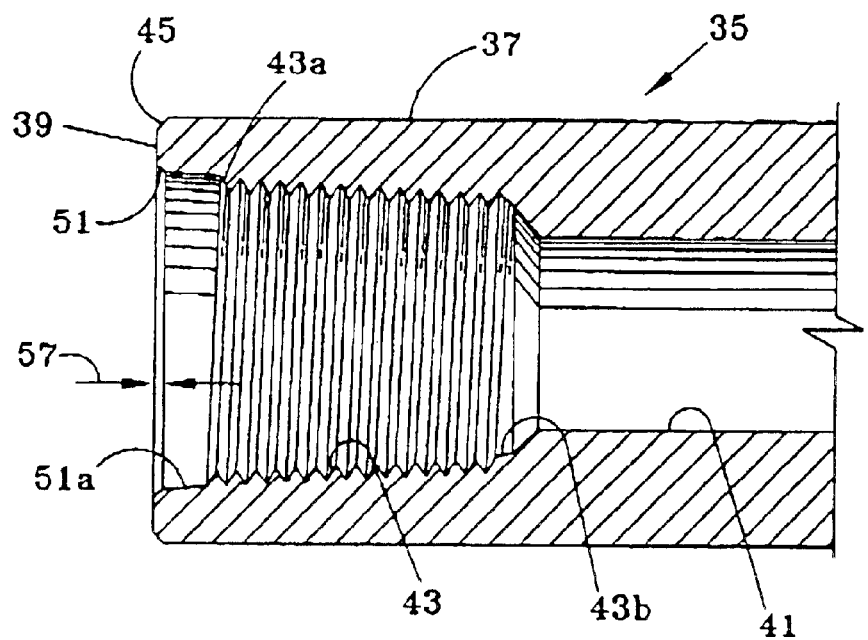
FIG. 2 is a side section view of a tool joint box adapted to receive the prior art bench mark of FIG. 1.

FIGS. 1 and 2 are provided to show a prior art tool joint bench mark, in order to gain a clearer understanding of the indicator of the present invention. A tool joint pin 11 for a drill pipe member has a cylindrical surface 13 containing an inner bore (not shown). External threads 15 are formed on the end of the cylindrical surface 13. The threads 15 have a first end 15a located at the extreme end of the tool joint pin 11. The threads 15 extend along the tool joint 11 for a selected distance, terminating at a second end 15b. The threads 15 are tapered, resulting in a smaller outer diameter at the first end 15a than at the second end 15b.

A make-up shoulder 17 is formed in the tool joint 11 a selected distance from the gage point of the threads 15 and inward from the end 15b. The make-up shoulder 17 is an annular surface located in a plane perpendicular to the axis of the tool joint pin 11. The make-up shoulder 17 faces outwardly and has a bevel 19 formed at its intersection with the cylindrical surface 13.

A cylindrical section 15c is also defined between the end 15b and a bench mark 27. The bench mark 27 is formed between the make-up shoulder 17 and the cylindrical section 15c. The bench mark 27 faces outwardly and defines an edge contained in a plane that is parallel with the make-up shoulder 17. As indicated by the arrows 33 in FIG. 1, the bench mark 27 is used to measure the distance from the make-up shoulder 17 to the bench mark, which originally is preferably 1/8 inch. Should the make-up shoulder 17 be redressed, this reference distance will increase, and will serve as an indication of whether or not a sufficient amount of compression will be able to be achieved. If the increase in the reference distance exceeds a selected standard amount, such as 1/32 inch, then the tool joint pin 11 will not be suitable for further use.

FIG. 2 depicts a corresponding tool joint box 35. Tool joint box 35 has a cylindrical outer surface 37. On its extreme outer end, a make-up shoulder 39 is formed. The make-up shoulder 39 is an annular surface located in a plane that is perpendicular to the axis of tool joint box 35. The tool joint box 35 has an inner bore 41. A set of internal threads 43 are machined into the bore 41. The threads 43 have an outer end 43a that is located a selected distance from make-up shoulder 39, and an inner end 43b that is located a selected distance further inward. The threads 43 are tapered, or formed in a frusto-conical surface, with the inner end 43b being of a lesser diameter than the outer end 43a. A bevel 45 is formed at the intersection of the make-up shoulder 39 with the cylindrical surface 37. As indicated by the arrows 57 in FIG. 3, bench mark 51 will indicate the distance from make-up shoulder 39 to bench mark 51. If this distance becomes too small, due to redressing of the make-up shoulder 39, then this will indicate that the tool joint 35 must be discarded.

When the pin 11 and the box 35 are made up, the cylindrical section 15c mates up with a complementary inside cylindrical section 51a and a bench mark 51 mates up with the bench mark 27. Thus, when the make-up shoulder 17 is in abutting contact with the make-up shoulder 39 the bench marks 51 and 27 will be obscured. The present invention addresses this drawback, as shown in FIGS. 3 and 4.

Figure 3:
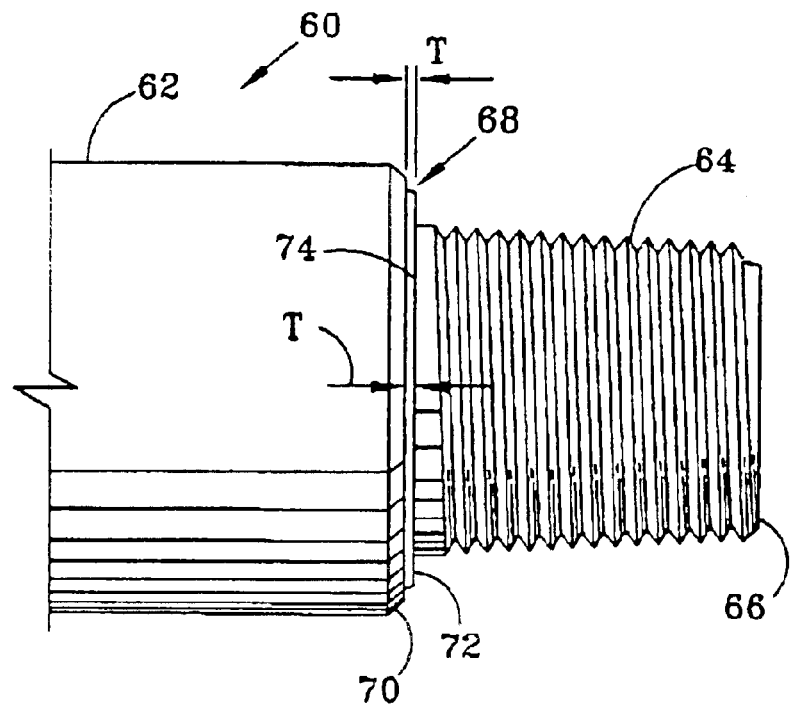
FIG. 3 is a side view of a tool joint pin having a bench mark in accordance with this invention.

As shown in FIG. 3, a tool joint pin 60 defines a cylindrical surface 62 which has an internal bore (not shown). Frusto-conical or tapered threads 64 extend from the surface 62 of the pin 60, terminating in an outer end 66. To this point, the pin 60 is similar to the pin 11 previously described in respect of FIG. 1. However, the pin 60 does not include the bench mark 27; rather, the pin 60 defines a bevel shoulder 68 which extends annularly around a surface 70 at the end of the surface 62. Further, an annular surface 72 defines a makeup plate 74, when the pin 60 is made up with the box shown and described below in respect of FIG. 4. It is to be understood that the term "makeup plate" is used to define the structure, while the makeup plate is preferably formed as a unitary body with the pin, and not as a separable manufacture, although such a separable manufacture would fall within the scope and spirit of the invention.

When the pin 60 is refaced, the annular surface 72 is reduced, up to a maximum of 1/16", and thus a thickness T of the makeup plate 74 is initially 1/16", and is reduced as the pin is refaced.

Figure 4:
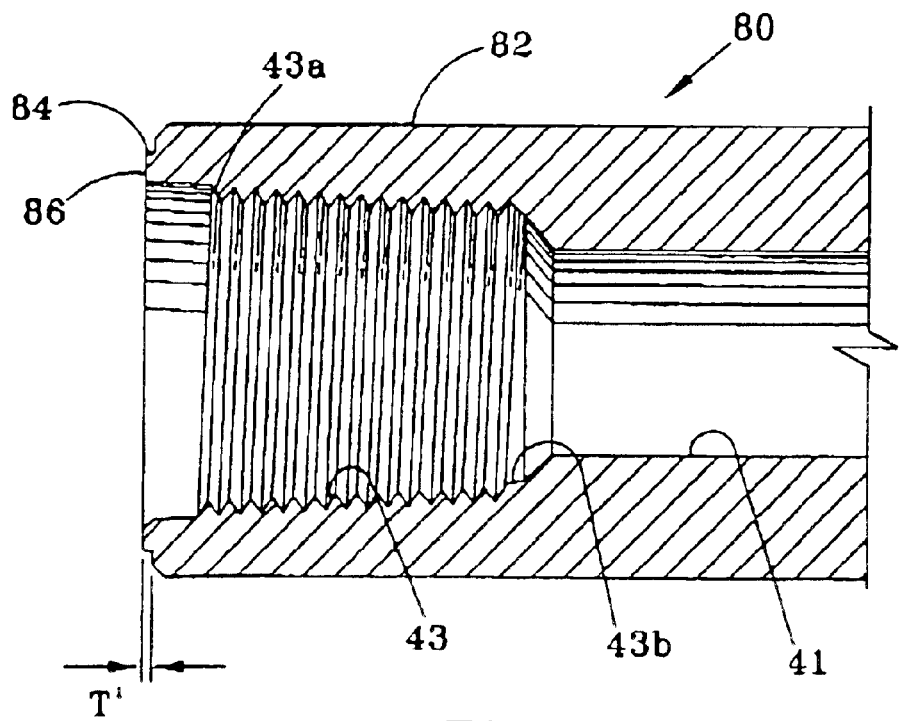
FIG. 4 is a side section view of a tool joint box adapted to receive the tool joint pin of FIG. 3.

FIG. 4 depicts a tool joint box 80 of the invention. The tool joint box 80 has a cylindrical outer surface 82. At the extreme outer end of the surface 82, a makeup plate 84 of thickness T' is provided. The makeup plate 84 abuts the makeup plate 74 when the tool joint is made up, as shown and described below regarding FIG. 6. The box 80 is refaced, the thickness T' of the makeup plate 84 is reduced. The tool joint box 80 has the inner bore 41. A set of internal threads 43 are machined into the bore 41. The threads 43 have an outer end 43a that is located a selected distance from a mating surface 86 of the makeup plate 84 and an inner end 43b that is located a selected distance further inward. The threads 43 are tapered, or formed in a frusto-conical surface, with the inner end 43b being of a smaller diameter than the outer end 43a.

As shown in FIGS. 5a, 5b, and 6, the makeup plate 84 preferably defines a bevel 90 at the bevel shoulder 68. Alternatively, as shown in FIG. 5b, the makeup plate may have a vertical surface into the box 80. The pin may be formed in a similar fashion, with the makeup plate 74 defining a vertical edge. When the pin 60 and the box 80 are made up together, the makeup plates 74 and 84, respectively, define a measurable gap 94, shown in FIG. 6. To determine if the surfaces of the tool elements can be refaced, however, one need not make a measurement of the gap. If the gap 94 measures zero, then the elements must be re-machined. It is further to be understood that while the ability to measure the gap while the box and pin are made up is a feature of the invention, the invention is further defined by the makeup plate extending axially toward the threaded connection.

The invention has a number advantages. The makeup plates provide a visible gap when the pin and box are made up, and thus provide an immediately apparent indicator for refacing the elements. This feature of the invention allows a user to determine visually, without measurement, whether or not a connection may be further refaced. The visual indicator may take several forms, two of which have been shown and described. The invention provides the further advantage in that it is adaptable to other products such as for example drill collars and heavyweights which have stress relief grooved pins making the present invention particularly attractive to such applications.

While the invention has been shown in only two of its forms, it should be apparent to those skilled in the art that it is not so limited but is susceptible to various changes and modifications without departing from the spirit of the invention.

I claim:

1. A refacing indicator for a tool joint of the type having a pin and a box each defining an outer surface, each of the pin and the box having mating threads the refacing indicator comprising:
   a makeup plate formed on each of the pin and the box, each makeup plate defining an annular shoulder intended for makeup with the annular shoulder of the other makeup plate and having a makeup surface set in from the outer surface and axially spaced from a reference surface on the respective pin and the box, each reference surface on the respective pin and box being radially outward of a respective makeup surface and generally perpendicular to an axis of the tool joint, so that when the pin and box are made up, the abutting makeup surfaces are in compression and the reference surfaces define a measurable gap between the pin and box observable from an exterior of the made-up tool joint.

2. The refacing indicator of claim 1, wherein each makeup plate includes an annular beveled edge extending radially outward from the makeup surface.

3. The refacing indicator of claim 1, wherein each makeup plate includes an annular edge radially outward from the makeup surface which is substantially parallel to the axis of the tool joint.

4. The refacing indicator of claim 1, wherein the makeup plates define a thickness of the maximum permitted refacing of each of the pin and the box.

5. The refacing indicator of claim 4, wherein the thickness is about 1/16".

6. A refacing indicator for a tool joint of the type having a pin and a box each defining an outer surface and mating threads, the pin including a pin makeup surface intended for makeup with a box makeup surface to transmit a compressive force between the pin and the box when the tool joint is made up, the refacing indicator comprising:

a pin makeup plate formed on the pin and defining an annular shoulder including the pin makeup surface set in from the outer surface of the pin and axially spaced from a pin reference surface generally perpendicular to an axis of the tool joint and radially inward of the pin reference surface, the pin makeup plate being axially reduced in thickness when the pin is refaced to reduce en axial spacing between the pin makeup plate and the pin reference surface; and a box makeup plate formed on the box and defining an annular box shoulder including the box makeup surface set in from the outer surface of the box and axially spaced from a box reference surface generally perpendicular to an axis of the tool joint and radially inward of the box reference surface, the box makeup plate being axially reduced in thickness when the box is refaced to reduce an axial spacing between the box makeup plate and the box reference surface, such that when the pin and the box are made up, the abutting makeup surfaces are in compression and the reference surfaces define a measurable gap between the pin and the box observable from an exterior of the made-up tool joint.

7. The refacing indicator of claim 6, wherein the makeup plate on each of the pin and box includes an annular beveled edge extending radially outward from the respective makeup surface.

8. The refacing indicator as defined in claim 6, wherein the pin makeup plate extends radially inward to substantially the threads on the pin, and the box makeup plate extends radially inward to substantially the threads on the box.

9. The refacing indicator as defined in claim 6, wherein each of the pin makeup plate and the box makeup plate are radially inward from the respective reference surface on the pin and the box.

10. A method of visually indicating whether a tool joint including a pin and a box must be refaced, comprising:

forming a makeup plate on the pin, the makeup plate defining an annular shoulder set in from the outer surface and having a pin makeup surface intended for makeup with a box makeup plate, the makeup surface on the pin axially spaced from a pin reference surface radially outward of the pin makeup surface;

forming the box makeup plate on the box, the box makeup plate defining an annular box shoulder set in from the outer surface and having a box makeup surface, the box makeup surface axially spaced from a box reference surface radially outward of the box makeup surface;

making up the pin and the box so that the abutting makeup surfaces on the pin makeup plate and on the box makeup plate are in compression; and refacing at least one of the pin and the box to reduce an axial thickness of the respective makeup plate and the axial spacing between a respective makeup plate and a respective reference surface; and;

thereafter observing a gap between the pin reference surface and the box reference surface from the exterior of the made-up tool joint.

11. The method as defined in claim 10, further comprising:

forming an annular beveled edge on each of the pin makeup plate and the box makeup plate extending radially outward from the respective makeup surface.

12. The method as defined in claim 10, further comprising:

extending the pin makeup plate and the box makeup plate radially inward to substantially the threads on the respective pin and box.

13. A method as defined in claim 10, wherein a thickness of each of the pin makeup plate and box makeup plate is the maximum permitted thickness for refacing the respective pin and the box.

14. The method as defined in claim 10, wherein each reference surface on the respective pin and box is radially outward of a respective makeup surface and generally perpendicular to an axis of the tool joint.

* * * * *

UNITED STATES PATENT AND TRADEMARK OFFICE
CERTIFICATE OF CORRECTION

PATENT NO. : 6,896,300 B2
DATED : May 24, 2005
INVENTOR(S) : Thomas Edward Winship It is certified that error appears in the above-identified patent and that said Letters Patent is hereby corrected as shown below:

Column 5,
Line 14, delete the word "en".

Column 6,
Line 14, delete the word "an d".

Signed and Sealed this

Eleventh Day of October, 2005

JON W. DUDAS
*Director of the United States Patent and Trademark Office*